June 12, 1934.  K. DAIMLER ET AL  1,962,483
ACIDPROOF MASONRY
Filed May 11, 1931
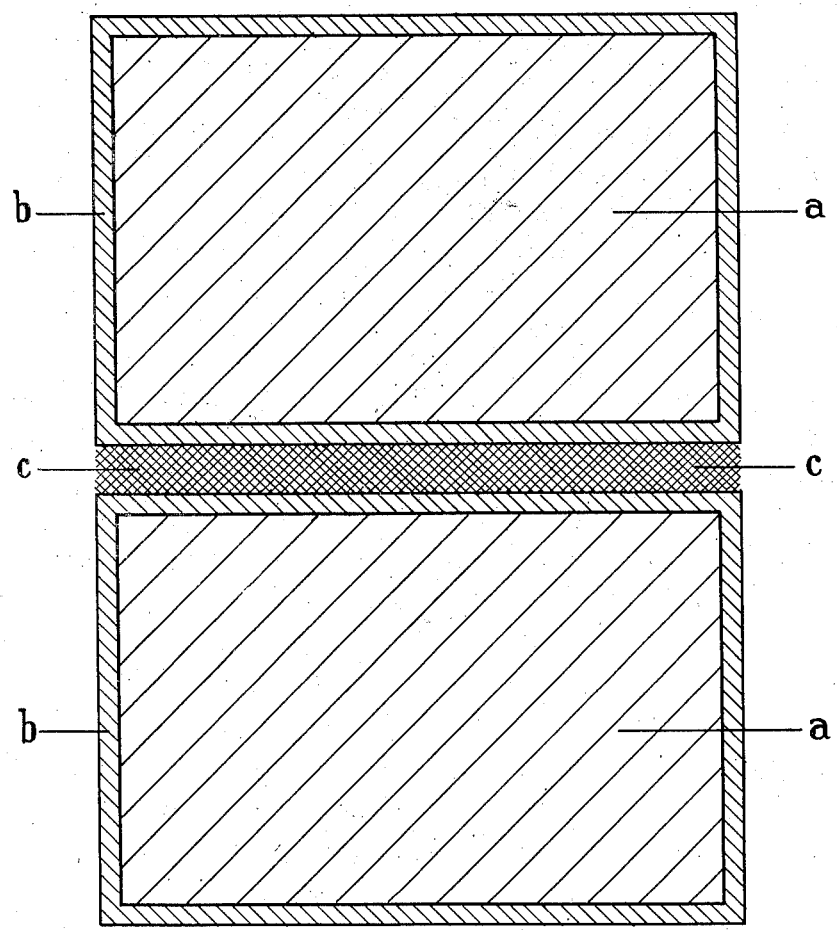
INVENTORS:
Karl Daimler,
Paul Kurzenberger,
By Byrnes Townsend & Potter,
ATTORNEYS.

Patented June 12, 1934

1,962,483

UNITED STATES PATENT OFFICE 1,962,483

ACIDPROOF MASONRY

Karl Daimler, Frankfort-on-the-Main-Hochst, and Paul Kurzenberger, Frankfort-on-the-Main-Griesheim, Germany, assignors to I. G. Farbenindustrie Aktiengesellschaft, Frankfort-on-the-Main, Germany Application May 11, 1931, Serial No. 536,686
In Germany July 16, 1930

2 Claims. (Cl. 72—36)

The present invention relates to acid-proof masonry from non-acid-proof stones and a process of making it.

We have found that stones of all kinds which are not acid-proof can be used for the preparation of acid-proof masonry, by coating them in a well moistened state with a coarsely dispersed aqueous bitumen emulsion free from soaps and alkalies, for instance, by dipping. The stones thus treated are stored for drying in such a manner that they cannot stick together, for instance by placing battens underneath which are powdered with quartz or the like or coated with a pulp of quartz powder. The dried stones are built up in the usual manner with a homogeneous mortar which is prepared by intimately mixing a coarsely dispersed aqueous bitumen emulsion free from soaps or alkalies and mineral powder, for instance sand or quartz powder or the like. After having dried for a few days these masonries are, in spite of the fact that the stones themselves are not acid-proof, surprisingly resistant to acids and acid gases and at the same time also to comparatively high temperatures, so that, for instance, a pyrites roasting furnace, whose inside is lined with acid-proof stones, can be provided with an external casing resistant to sulfur dioxide gas according to the process described.

Conduits or chimneys, constructed according to this process, are suitable for conducting acid waste liquids, acid gases and the like. But the process may also be applied to other purposes.

Under the terms "coarsely dispersed aqueous bitumen emulsions free from soaps and alkalies" are to be understood such emulsions as are more or less permanent, that is to say as do not break or coagulate when mixed with finely powdered minerals, various kinds of dust, dye powders, dye solutions and the like. Particularly suitable emulsions are, for instance, such emulsions as are prepared by means of liginic acid, humic acid, insoluble huminates, silicic acid and the insoluble salts of this acid such as, for instance, silicates and the like.

Under the term "bitumen" are included both natural and artificial asphalts (the artificial being for instance the petroleum product); also tar products, pitches and mixtures of these bodies. Under the term "humic acid" and "materials containing humic acid" are included the following products:

Humic acid obtainable by precipitating by means of acid an alkaline extract from raw material containing humic acid, such as Cassel brown, brown coal, peat or decayed vegetable matter; the said raw materials themselves, generally in the finely subdivided form in which they can be obtained, for example by means of grinding with water; the insoluble salts of humic acids, such as the lime, magnesium, iron or aluminum salts; the sparingly soluble or insoluble labile ammonium salts; products which can be called artificial humic acids, such as, for example, carbonized organic substances in so far as they are soluble in alkali to brown solutions; certain oxidation products of, for instance, tar, hard pitch, nitration products of coal, pitches and the like in so far as these have the characteristic properties of humic acid, namely the brown color and the solubility in alkali.

The following example serves to illustrate the invention, but it is not intended to limit it thereto, the parts being by weight:

Bricks are dipped into an asphalt emulsion consisting of 4 per cent. of brown coal rich in humic acid, 50 per cent. of petroleum asphalt which softens at 20° C.—30° C. by the Krämer-Sarnow test and 46 per cent. of water and then dried by exposure to air. The stones are then built up with a mortar which consists of 20 parts of the above-named asphalt emulsion and 80 parts of sand.

The annexed drawing serves to illustrate the process more clearly, the invention, however, is not to be considered as limited to the illustrated modification. The drawing shows in cross section two originally non-acid-proof stones, provided with the acid-proof coating and combined with each other by the acid-proof mortar. The letter *a* of the drawing indicates the stones; the letter *b* of the drawing indicates the coating of the stones and the letter *c* indicates the layer of acid-proof mortar between the two stones.

In the following claims there is to be understood by the term "aqueous bitumen emulsion" such bituminous emulsions as do not contain any soaps and alkalies, that is to say as are more or less permanent, and do not break when mixed with finely powdered minerals, various kinds of dust, dye powders, dye solutions and the like.

We claim:

1. Acid-proof masonry comprising non-acid-proof stones coated with a coarsely dispersed bitumen emulsion prepared by means of humic acid, the spaces between said stones being filled with a mortar consisting of an intimate mixture of a mineral powder and a coarsely dispersed bitumen emulsion prepared by means of humic acid.

2. Acid-proof masonry comprising non-acid-proof stones, coated with an aqueous bitumen emulsion containing an emulsifying agent selected from the group consisting of lignic acid, humic acid, insoluble humates, silicic acid and an insoluble salt of said acid, or mixtures thereof, the spaces between said stones being filled with a mortar consisting of an intimate mixture of a mineral powder and an aqueous bitumen emulsion containing an emulsifying agent selected from the group above described.

KARL DAIMLER.
PAUL KURZENBERGER.